United States Patent
Ramirez et al.

(10) Patent No.: US 7,834,745 B2
(45) Date of Patent: Nov. 16, 2010

(54) REMOTE IGNITION, THEFT DETERRENCE, AND RECORDS KEEPING SYSTEM FOR A VEHICLE

(75) Inventors: Nick Ramirez, Englewood, FL (US); Reed W. Mapes, Bradenton Beach, FL (US)

(73) Assignee: Bulletproof Electronics, Inc., Bradenton, FL (US)

( * ) Notice: Subject to any disclaimer, the term of this patent is extended or adjusted under 35 U.S.C. 154(b) by 138 days.

(21) Appl. No.: 11/937,576

(22) Filed: Nov. 9, 2007

(65) Prior Publication Data

US 2008/0290998 A1 Nov. 27, 2008

Related U.S. Application Data

(63) Continuation-in-part of application No. 11/119,129, filed on Apr. 29, 2005, now abandoned.

(51) Int. Cl.
*B62H 5/00* (2006.01)

(52) U.S. Cl. ............... 340/427; 340/432; 340/425.5; 340/426.19; 340/426.2; 340/435; 340/436; 340/440; 340/539.1; 340/539.11

(58) Field of Classification Search ............. 340/427, 340/432, 425.5, 426.19, 426.2, 435, 436, 340/440, 539.1, 539.11
See application file for complete search history.

(56) References Cited

U.S. PATENT DOCUMENTS

| | | | |
|---|---|---|---|
| 5,347,263 A | 9/1994 | Carroll et al. | |
| 5,640,057 A | 6/1997 | Hirata et al. | |
| 5,883,444 A | 3/1999 | Hirata et al. | |
| 5,937,065 A | 8/1999 | Simon et al. | |
| 6,008,722 A | 12/1999 | Hirozawa et al. | |
| 6,078,252 A | 6/2000 | Kulczycki et al. | |
| 6,118,379 A | 9/2000 | Kodukula et al. | |
| 6,169,943 B1 | 1/2001 | Simon et al. | |
| 6,323,566 B1 | 11/2001 | Meier | |
| 6,378,774 B1 | 4/2002 | Emori et al. | |
| 6,489,886 B2 | 12/2002 | Meier | |
| 6,496,100 B1 | 12/2002 | Hiebl | |
| 6,606,492 B1 | 8/2003 | Losey | |
| 6,653,747 B1 | 11/2003 | Proefke et al. | |
| 6,707,373 B2 | 3/2004 | Moreau | |
| 6,737,955 B2 | 5/2004 | Ghabra et al. | |
| 6,871,624 B2 * | 3/2005 | Janisch .................. 123/179.2 |
| 6,898,489 B1 | 5/2005 | Hayes, Sr. | |
| 2001/0035813 A1 | 11/2001 | Meier | |
| 2002/0033752 A1 | 3/2002 | Greenwood et al. | |
| 2002/0087867 A1 | 7/2002 | Oberle et al. | |
| 2003/0071717 A1 | 4/2003 | Hagl et al. | |
| 2003/0137409 A1 | 7/2003 | Kikkawa et al. | |
| 2004/0017281 A1 | 1/2004 | Dix | |

(Continued)

*Primary Examiner*—Daryl Pope
(74) *Attorney, Agent, or Firm*—Michael J. Colitz, III; Gary Robinson, P.A.

(57) ABSTRACT

Disclosed is a key-less ignition system for a vehicle. The system allows a user to automatically start the engine of a vehicle via a push button and a remote passive transponder. The system finds particular application in conjunction with smaller vehicles such as motorcycles. In one specific embodiment of the invention, the system is used in connection with an anti-theft device, such as a wheel lock. In yet another embodiment of the invention, the key-less ignition system is used in connection with a records management system, whereby service technicians can remotely retrieve maintenance records relating to the vehicle.

9 Claims, 3 Drawing Sheets

U.S. PATENT DOCUMENTS

| | | |
|---|---|---|
| 2004/0046452 A1 | 3/2004 | Suyama et al. |
| 2004/0063477 A1 | 4/2004 | Konno |
| 2004/0090124 A1 | 5/2004 | Geber et al. |
| 2004/0090307 A1 * | 5/2004 | Konno ...................... 340/5.62 |
| 2004/0090308 A1 | 5/2004 | Takahashi et al. |
| 2006/0164217 A1 * | 7/2006 | Bourgine De Meder ..... 340/432 |
| 2006/0187043 A1 | 8/2006 | Allen |

* cited by examiner

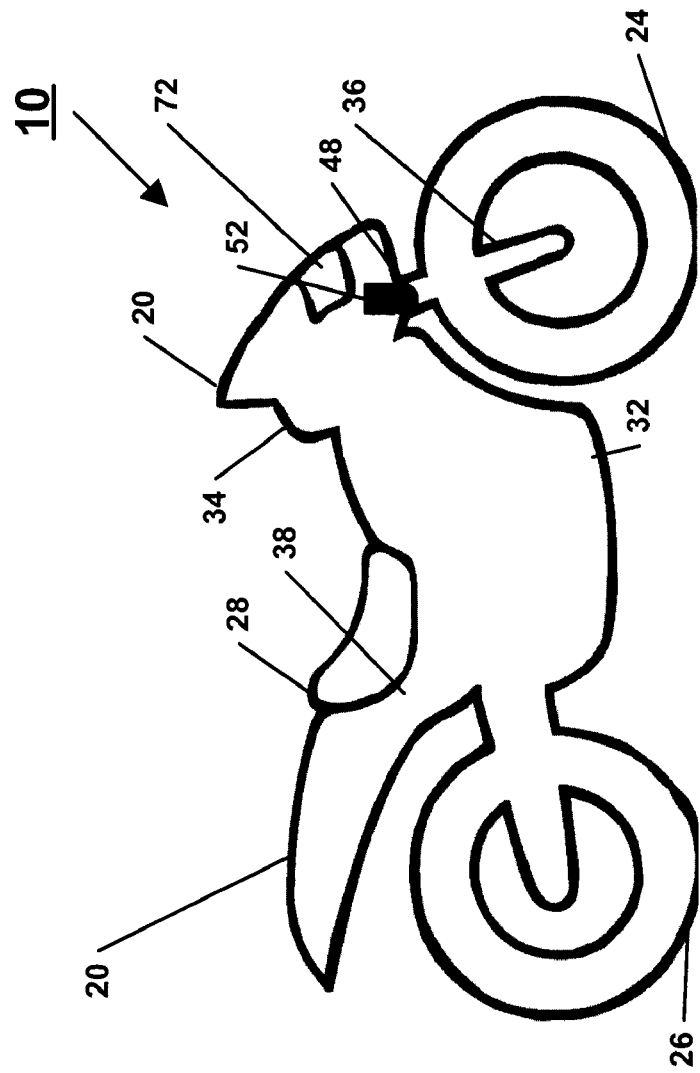
FIG. 1
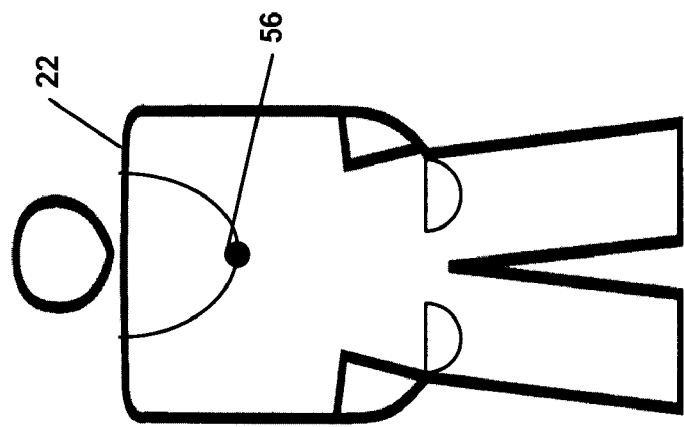

REMOTE IGNITION, THEFT DETERRENCE, AND RECORDS KEEPING SYSTEM FOR A VEHICLE

CROSS-REFERENCE TO RELATED APPLICATIONS

This application is a continuation in part of and claims priority to utility patent application entitled "Key-less Control Apparatus for Motor Vehicles" filed on Apr. 29, 2005 now abandoned under application Ser. No. 11/119,129. The contents of this application are incorporated herein by reference.

BACKGROUND OF THE INVENTION

1. Field of the Invention

This invention relates to a system for the key-less ignition of a vehicle. More particularly, the present invention relates to a key-less ignition system that can also be use in theft deterrence and the storage of maintenance records.

2. Description of the Background Art

The prior art contains several examples of key-less entry systems. For example, U.S. Pat. No. 6,496,100 to Hiebl discloses a remote control key system having keyless entry functions and a vehicle immobilizing function in a common keyhead. The objective of the invention is to prevent the inadvertent operation of remote keyless commands.

Likewise, U.S. Pat. No. 6,606,492 to Losey discloses a keyless entry system that includes a controller that operates in one of two modes. When an authentication signal is received from a passive signaling device, the controller operates in one mode that permits more convenient access to a user. When an authentication signal is not received from the passive signaling device, the controller requires another mode of operation from a manually operable signaling device.

Although the above referenced inventions achieve their individual objectives, both suffer from drawbacks. Namely, none of the referenced inventions is directed at key-less entry system that are sized to be contained within a smaller vehicle. Moreover, none of the referenced inventions disclose a key-less entry system that is adapted to be used in connection with auxiliary systems, such as anti-theft devices and/or records keeping systems.

SUMMARY OF THE INVENTION

It is therefore one of the objectives of this invention to provide a key-less ignition system that is compact in design and which can be stored within a smaller vehicle, such as a motorcycle.

It is another objective of this invention to provide a key-less ignition system that operates in conjunction with an anti-theft device, such as a wheel lock.

It is yet another objective of this invention to provide a key-less ignition system that operates in conjunction with records keeping system, whereby maintenance records can be easily and conveniently retrieved by service personnel whereby the system can be employed as a sales tool and is further used in helping sales people build a rapport with customers.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a respective view of the vehicle and operator worn transponder of the present invention.

Similar reference characters refer to similar parts throughout the several views of the drawings.

DETAILED DESCRIPTION OF THE PREFERRED EMBODIMENT

Figure 2:
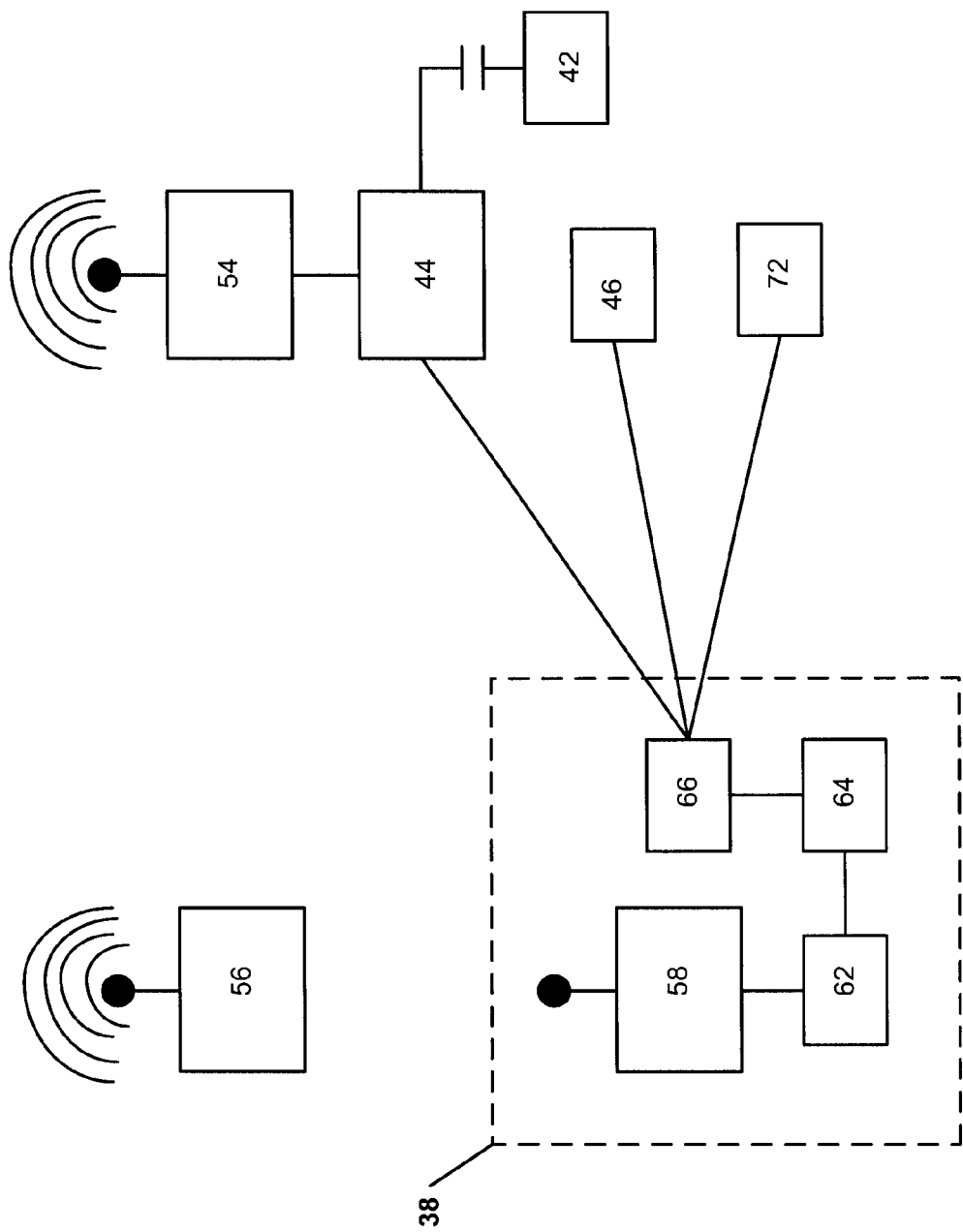
FIG. 2 is a schematic view of the various components of the present invention.

The present invention relates to a key-less ignition system for a vehicle. The system allows a user to automatically start the engine of a vehicle via a push button and a remote passive transponder. The system finds particular application in conjunction with smaller vehicles such as motorcycles. However, the invention also finds application in connection with vehicles, hot rods and/or heavy machinery.

In one specific embodiment of the invention, the system is used in connection with an anti-theft device, such as a wheel lock. In yet another embodiment of the invention, the key-less ignition system is used in connection with a records management system, whereby service technicians and sales people can remotely retrieve maintenance records relating to the vehicle, as well as customer information to foster a rapport between the customers and sales staff. The various components of the present invention, and the manner in which they interrelate, will be described in greater detail hereinafter.

With reference now to FIG. 1, the system 10 is illustrated in use upon a motorcycle 20. However, it should be noted that the present invention can likewise be used in connection with cars, open vehicles such as hot rods, and heavy machinery, such as backhoes and excavators. In short, the invention finds application in connection with any vehicle that is subject to theft or joyriding.

Nonetheless, the embodiment depicted in FIG. 1 is a motorcycle. As is typical, the motorcycle 20 includes a front wheel 24, a rear wheel 26, and a seat 28 therebetween. Motorcycle 20 further includes a motor 32 for powering at least one of the wheels. A pair of handlebars 34 are interconnected to front wheel 24 via a frame member 36 to enable a user to maneuver the vehicle. The various components of the key-less ignition system are adapted to be positioned with a compartment 38 located beneath seat 28. The seat is therefore pivotable to allow the user to gain access to compartment 38.

The motorcycle includes a push button starter. Namely, push button 42 (note FIG. 2) is operatively connected to an ignition 44, which in turn, activates motor 32. In accordance with the present invention, ignition 44 has both an activated state and a deactivated state. This permits push button 42 to start motor 32 only when ignition 44 is in the activated state.

With reference to FIG. 1, one example of a theft deterrence system 46 that can be used in conjunction with the present invention is illustrated. The theft deterrence system 46 depicted is a solenoid operated steering lock. The lock includes a locking bolt 48 that can be received within both an outer frame of motorcycle 20 and the adjacent wheel frame 36. Bolt 48 can be selectively extended or retracted by operation of a solenoid 52. Thus, the lock has a secured orientation wherein the locking bolt 48 is extended and rotation of the handlebars 34 and front wheel 24 is prevented. Lock further includes an unsecured orientation whereby bolt 48 is retracted and normal movement of the handlebars 34 and front wheel 24 is permitted. It is also within the scope of the present invention to employ a line lock as the theft deterrence system 46. Suitable line locks are made by B&M Products of Chatsworth, Calif.

The compartment 38 within motorcycle 20 stores the various component of the key-less ignition system. These various components are illustrated with reference to FIG. 2. One of these components is a transmitter 54. Transmitter 54 can be a Radio Frequency, Infra Red, laser or sound based transmitter. However, in the preferred embodiment an RF transmitter is utilized. Transmitter 54 is operatively interconnected to ignition 44. In use, when the push button 42 is depressed transmitter 54 sends out RF triggering signals for receipt by a nearby transponder.

As noted in FIG. 1, the preferred transponder 56 is a small operator worn transponder 56. Preferably, transponder 56 is small enough to be worn around the neck of an operator 22 or within a pocket. Transponder 56 is preferably a passive transponder that uses a parasitic power generated from the triggering signal. Upon receipt of the triggering signal, transponder 56 sends out a unique identification signal. This identification signal is preferably encoded via a Frequency Shift Keying ("FSK") or Amplitude Shift Keying ("ASK") modulation. Those skilled in the transponder arts will appreciate other modes for encoding the signal generated by transponder 56.

The encoded signal generated by 56 transponder is then received by an antenna 58 positioned within the compartment 38 of motorcycle 20. Antenna 58 is operatively interconnected to both a microprocessor 62 and memory 64, which are similarly positioned within compartment 38. Antenna 58, microprocessor 62 and memory 64 are preferably powered via the 12 VDC battery in the vehicle. Nonetheless, the use of a dedicated power source is also within the scope of the present invention. Memory 64 is used in storing one or more pre-determined identification signals.

In use, when antenna 58 receives identification signals from transponder 56, microprocessor 62 compares identification signals received with the pre-determined identification signals stored within memory 64. When a proper match is made, an enabling single is sent to a controller 66. In response to the enabling signal, controller 66 brings ignition 44 into the activated state. This, in turn, allows ignition 44 to be activated via push button 42. In the absence of a proper match, no enabling signal is sent and ignition 44 remains in the de-activated state.

The enabling signal can also be used to deactivate anti-theft system 46. When deactivated, the wheel lock is brought into the unsecured state, whereby the locking bolt 48 is retracted so as to permit normal operation of motorcycle 20. Again, in the absence of a match between the identification signal received by antenna 58 and the identification signal stored in memory 64, the lock is maintained in its secured state and rotation of the handlebars 34 is prohibited.

Still yet other auxiliary devices can be operated by way of the controller. For example, in addition to anti-theft 46 and records keeping devices, the vehicle headlights 72 can also be operable in response to a positive ID match.

Thus, the present invention provides a method that will automatically recognize the operator 22 of a vehicle by matching an identification code emitted by a transponder 56 carried by an operator 22. This allows operation of the motor vehicle without the use of traditional keys and key switch devices. Namely, the invention provides communication back and forth between transponder 56 and vehicle 20, to determine if the identification code matches the vehicle stored identification code, thereby eliminating the need to locate a key and place it into a keyhole.

The system 10 utilizes a microprocessor 62 that is designed and pre programmed with intuitive logic and algorithms for communicating back and forth with the transponder 56, or other ID device, to ensure that the owner operator 22 is the only person allowed to activate the vehicle 20 and prepare it for operation. This, in turn, ensures that unwanted operators will continuously be eliminated and prevented from operating the vehicle 20.

The invention incorporates the internal 12 VDC power, or other power from the motor vehicle 20, to energize the microprocessor 62 and an associated controller 66, to permit the control of solenoid steering locks 48, ignition systems 44, anti-theft devices 46, safety inter-locks, and the starter motor whenever necessary to achieve a user friendly operation of vehicle 20.

The placement of the antenna 58 is critical to the proper function of this invention. Antenna 58 must be placed within, on, under, around or near the operator's seat 28 to be inconspicuous and allow an unobstructed field to radiate and receive energy to and from transponder 56. Other possible locations for antenna 58 include the gas tank or instrument pod, headlights, tail lights, or fenders.

The dual usage of the starter button 42 is also critical to the proper function and operation of this invention. Transmitter 54 is initiated by the operator when the operator presses starter button 42. When starter button 42 is depressed this initiates the search for the transponder 56 in possession of operator 22. If the transponder 56 is found, transponder 56 initiates an identification signal that is then received by antenna 58. If the ID of the transponder 56 matches the ID of the motor vehicle, the ignition 44 is activated. When activated, the starter button 42 an be used to operate the ignition system. In addition, starter button 42 can optionally control a steering lock 48 can be de-activated, additional burglar or anti-theft device can be de-activated, lights 72 can be activated, and other safety interlocks can be checked prior or during the operation of the starter.

Figure 3:
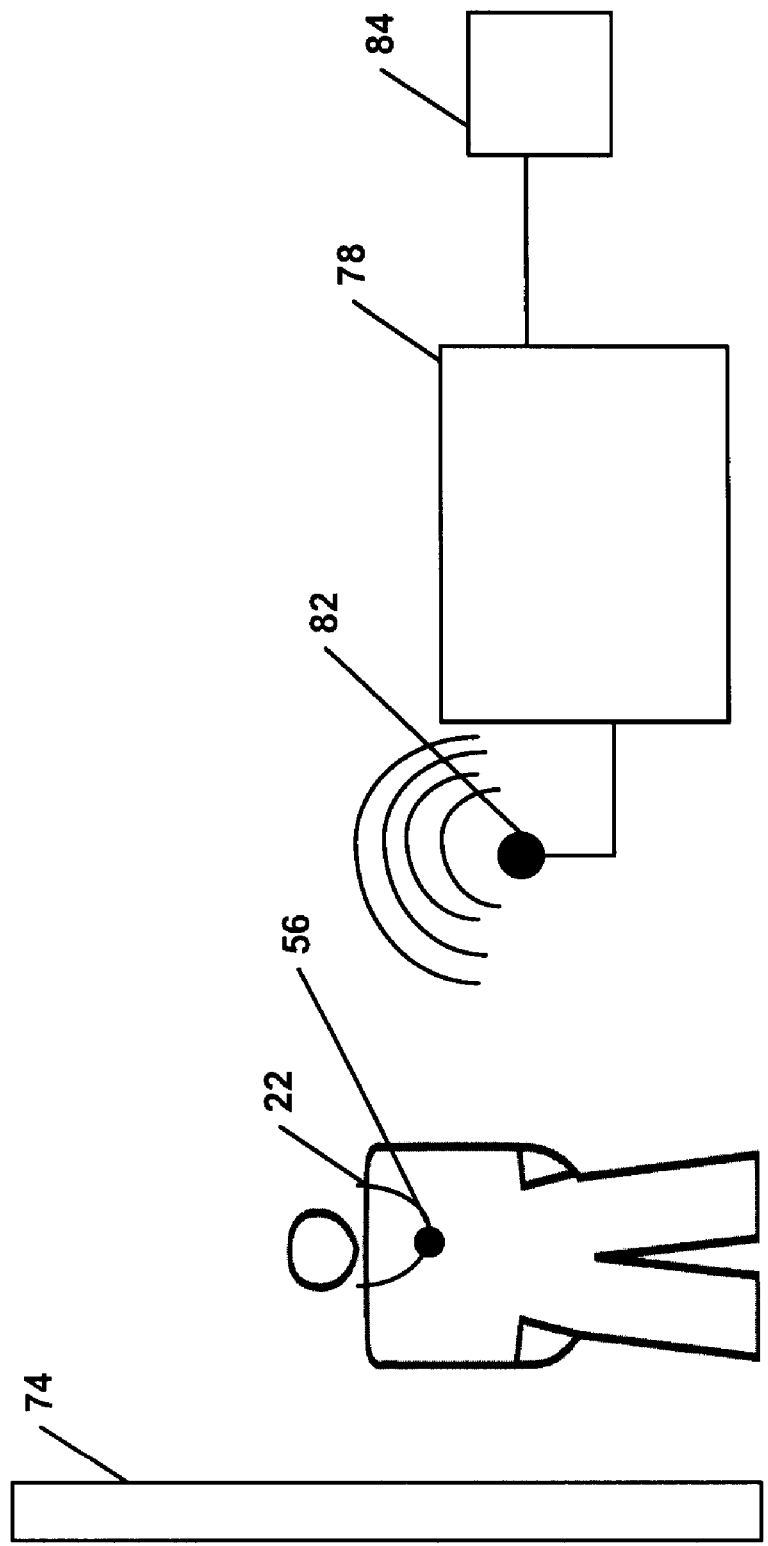
FIG. 3 is a schematic view of an alternative embodiment of the present invention.

The dual usage of the transponder 56 also forms an important part of the present invention. Namely, the transponder 56 is not only used to operate the vehicle 20, but it is also used by the vehicle dealership, service center, retailer or manufacturer to identify the owner at the time of service, parts and accessory purchases, and other activities where there is access to a computer. This feature of the present invention is illustrated in FIG. 3. In this embodiment, an antenna 74 is located in vertical panels on either side of the doorway to the showroom or service center. Antenna 74 could likewise be located in the floor adjacent a checkout counter. Antenna 74 continually sends out a triggering signal which is received by transponder 56 worn by a user 22 entering the showroom or service center. Alternatively, antenna 74 can be prompted by send out the triggering signal via a pressure sensitive switch or light beam adjacent the doorway.

Upon receiving the triggering signal, transponder 56 sends out an identification signal for receipt by an antenna 82 at the service center counter 78. A microprocessor 84 at the service center counter 78 then determines whether identification signal matches the pre-determined identification signals stored within the memory of microprocessor 84. If a match is made, microprocessor unlocks the maintenance records associated with the vehicle of user 22. Personal information regarding user 22 can also be unlocked by this process. All of this data can be stored within memory of microprocessor 84. Unless a proper identification signal is received, this information is encoded within microprocessor 84 and otherwise inaccessible by service center personnel. In this manner, the present invention can be employed in building a rapport between the service center personnel and the customer.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An ignition, theft deterrence, and records keeping system for a vehicle comprising:
    a motorcycle having a front wheel, a rear wheel, and a seat therebetween, the motorcycle further including a motor for powering one of the wheels and a pair of handlebars interconnected to the front wheel, a compartment located beneath the seat, a push button operatively connected to an ignition, the ignition having an activated state and a deactivated state, wherein the push button can selectively start the motor when the ignition is in the activated state;
    a solenoid operated steering lock, the lock having a secured orientation preventing the rotation of the handlebars and front wheel and an unsecured orientation permitting normal movement of the handlebars and front wheel;
    an operator worn transponder which sends out identification signals in response to first receiving triggering signals;
    a transmitter positioned within the compartment and operatively interconnected to the ignition, such that when the push button is depressed the transmitter sends out triggering signals for receipt by a nearby transponder;
    an antenna, microprocessor and memory all operatively interconnected to one another and positioned within the compartment, the memory storing a pre-determined identification signal relating to the motorcycle, the antenna adapted to receive identification signals from the transponder, wherein the microprocessor compares identification signals received by the antenna against the pre-determined identification signals stored within the memory;
    a controller operatively interconnected to the microprocessor, ignition, and steering lock, wherein when the microprocessor determines that the signals received by the antenna match the pre-determined identification signals stored within the memory, the controller brings the ignition into the activated state and the steering lock into the unsecured orientation;
    an antenna and a microprocessor with a memory associated with a vehicle service center, the memory storing maintenance records associated with the vehicle and personal information associated with the user, wherein the service center antenna continually sends out triggering signals for receipt by the transponder, and wherein the service center microprocessor compares identification signals from the transponder against pre-determined identification signals, and wherein the microprocessor permits access to the vehicle records and personal information upon a match between the identification signals and pre-determined identification signals.

2. An ignition system for a vehicle comprising:
    a motorcycle including push button ignition having an activated state and a deactivated state;
    an operator worn transponder which sends out identification signals;
    an antenna, microprocessor and memory all operatively interconnected to one another and positioned upon the motorcycle, the memory storing a pre-determined identification signal, the antenna adapted to receive identification signals from the transponder, wherein the microprocessor compares identification signals received by the antenna against the pre-determined identification signals stored within the memory;
    a controller operatively interconnected to the microprocessor and ignition, wherein when the microprocessor determines that the signals received by the antenna match the pre-determined identification signals stored within the memory, the controller brings the ignition into the activated state;
    an antenna and a microprocessor with a memory associated with a vehicle service center, the memory storing maintenance records associated with the vehicle and personal information associated with the user, wherein the service center antenna continually sends out triggering signals for receipt by the transponder, and wherein the service center microprocessor compares identification signals from the transponder against pre-determined identification signals, and wherein the microprocessor permits access to the vehicle records and personal information upon a match between the identification signals and pre-determined identification signals.

3. The system as described in claim 2 wherein the motorcycle includes a seat and a compartment located beneath the seat and wherein the antenna, microprocessor and memory are all located within the compartment.

4. The system as described in claim 2 wherein the motorcycle also includes an anti-theft device and wherein the controller de-activates the anti-theft device when the microprocessor determines that the signals received by the antenna match the pre-determined identification signals stored within the memory.

5. The system as described in claim 2 wherein the motorcycle also includes at least one headlight and wherein the controller activates at least one headlight when the microprocessor determines that the signals received by the antenna match the pre-determined identification signals stored within the memory.

6. The system as described in claim 2 further comprising a transmitter that transmits a triggering signal in response to an operator starting the ignition and wherein the transponder sends out the identification signal only in response to receiving a triggering signal.

7. An ignition system for a vehicle comprising:
    a vehicle including headlight and push button ignition having an activated state and a deactivated state;
    a transponder which sends out identification signals;
    an antenna, microprocessor and memory all operatively interconnected to one another and positioned upon the vehicle, the memory storing a pre-determined identification signal, the antenna adapted to receive identification signals from the transponder, wherein the microprocessor compares identification signals received by the antenna against the pre-determined identification signals stored within the memory;

a controller operatively interconnected to the microprocessor and ignition, wherein when the microprocessor determines that the signals received by the antenna match the pre-determined identification signals stored within the memory, the controller brings the ignition into the activated state and also turns on the headlights;

an antenna and a microprocessor with a memory associated with a vehicle service center, the memory storing maintenance records associated with the vehicle, wherein the service center antenna continually sends out triggering signals for receipt by the transponder, and wherein the service center microprocessor compares identification signals from the transponder against pre-determined identification signals, and wherein the microprocessor permits access to the vehicle records upon a match between the identification signals and pre-determined identification signals.

8. The system as described in claim 7 wherein the vehicle is a motorcycle.

9. The system as described in claim 8 wherein the transponder is worn by the user.

* * * * *